J. B. SHUTTLEWORTH.
CIRCULAR GLASS AND GASKET CUTTER.
APPLICATION FILED MAR. 25, 1910.
983,173.
Patented Jan. 31, 1911.
2 SHEETS—SHEET 2.
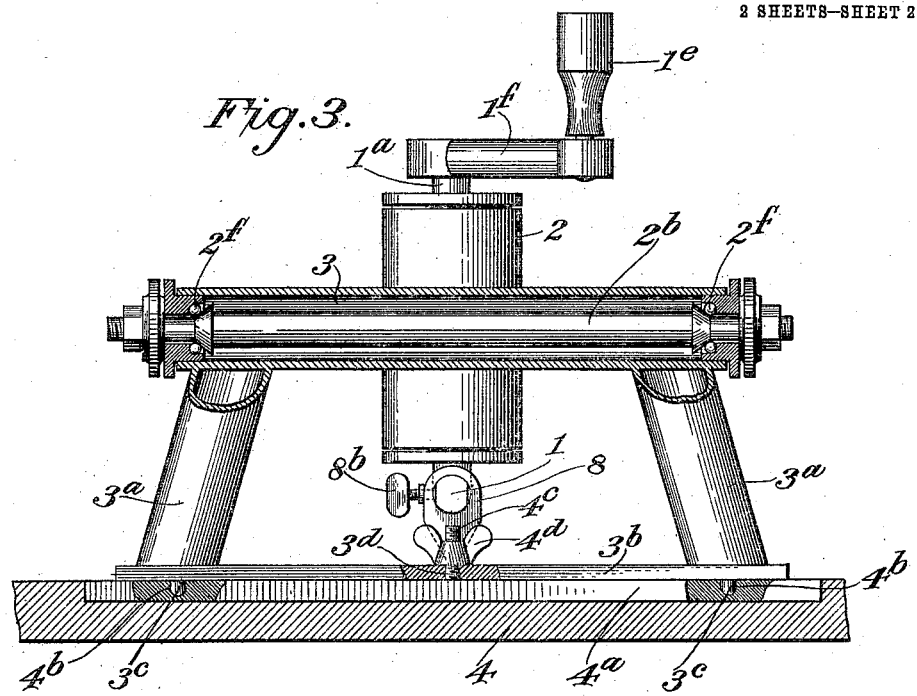
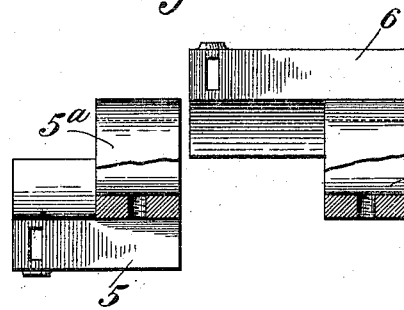
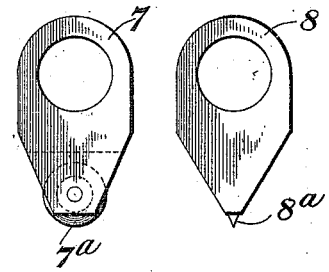
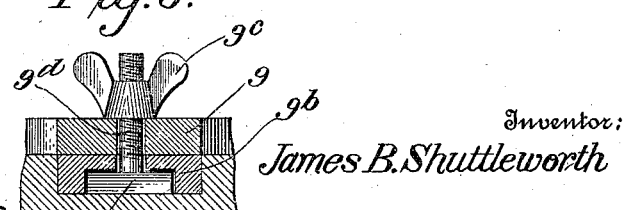
Inventor:
James B. Shuttleworth
By Alexander Sowell
Attorneys
Witnesses:

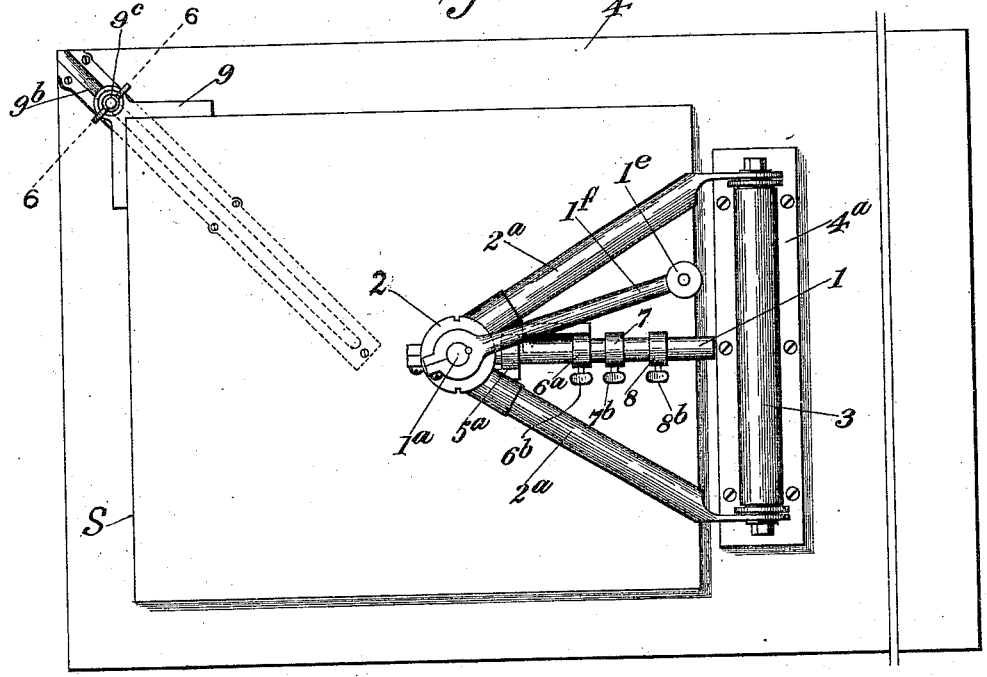

UNITED STATES PATENT OFFICE.

JAMES B. SHUTTLEWORTH, OF WEST SPRINGFIELD, MASSACHUSETTS.

CIRCULAR GLASS AND GASKET CUTTER.

983,173.   Specification of Letters Patent.   Patented Jan. 31, 1911.

Application filed March 25, 1910. Serial No. 551,523.

*To all whom it may concern:*

Be it known that I, JAMES B. SHUTTLEWORTH, of West Springfield, in the county of Hampden and State of Massachusetts, have invented certain new and useful Improvements in Circular Glass and Gasket Cutters; and I hereby declare that the following is a full, clear, and exact description thereof, reference being had to the accompanying drawings, which form part of this specification.

This invention is an improvement in machines for cutting circular disks, and annular plates, from glass, leather, and other material, and is especially adapted for use in cutting gaskets, and also for cutting circular disks from sheet glass.

The object of the invention is to provide a machine that can be readily operated by unskilled laborers; will be accurate in operation; can be easily adjusted to cut any desired size of disks or gaskets up to the maximum size, and will not be wasteful of material.

The machine illustrated in the accompanying drawings embodies the invention in the best form now known to me, but is of course capable of variation, within the scope of the invention, by skilled mechanics when once made acquainted therewith.

I will now describe the invention as embodied in said machine in detail and summarize in the claims the parts and combination of parts for which protection is desired.

In said drawings: Figure 1 is a top plan view of the complete machine ready for cutting a disk or gasket. Fig. 2 is an enlarged side elevation of the operative parts thereof, showing the cutter shaft bearings in section. Fig. 3 is a section on line 3—3, Fig. 2, looking in the direction of the arrows. Fig. 4 is a detail plan view of the cutter heads shown in Fig. 2. Fig. 5 is a side elevation of the circular and diamond point glass cutters shown in Fig. 2. Fig. 6 is a detail sectional view on line 6—6 Fig. 1.

The machine comprises means for cutting the disks and gaskets, and means for positioning a plate or sheet of glass or other stiff material from which the disks are to be cut beneath the cutter.

The cutting apparatus comprises a sweep or arm 1 which is connected to a vertical shaft $1^a$, (said sweep and shaft being preferably formed integral.) The shaft $1^a$ is journaled in bearings in a sleeve or housing 2, which is rigidly connected by arms $2^a$ to a shaft $2^b$, journaled in bearings in a tubular member 3 rigidly supported in a horizontal position, and connected by legs $3^a$ to a base plate $3^b$, which is preferably provided with studs $3^c$ on its under side adapted to engage sockets $4^b$ in a plate $4^a$ secured to the top of a table or bench 4. The plate $3^b$ can be securely but detachably fastened to table 4 by means of a threaded pin $4^c$ attached to plate $4^a$ and adapted to project through a hole $3^d$ in plate $3^b$, and be engaged by a thumb nut $4^d$ as shown. When thus attached to the table the cutting apparatus is secured accurately in position with member 3 horizontal; but the sleeve 2 can be swung vertically, up on shaft $2^b$, and shaft $1^a$ can be rotated in sleeve 2 and cause sweep 1 to swing around a true circle having shaft $1^a$ as its center.

Preferably the sweep 1 is mounted in ball bearings in the sleeve 2, as indicated at $1^c$, said bearings being of usual construction. Preferably also the shaft $2^b$ is mounted in ball bearings in member 3, as indicated at $2^f$, said bearings being of usual construction.

The shaft $1^a$ is provided on its upper end with a crank arm $1^f$ having a handle $1^e$ by which it can be turned so as to move sweep 1 around.

On sweep 1 are adjustably and detachably mounted slidable blocks 5, 6, 7, and 8, carrying cutters. The block 5 is provided with an eye $5^a$ engaging sweep 1, while the body of the block lies partly under and beside the sweep 1, see Fig. 4. Block 6 is constructed similarly but oppositely to block 5, its eye $6^a$ being so located that the body of the block lies below and to one side of sweep 1, and can be adjusted beside block 5, as indicated in the drawings; the blocks 5 and 6 being capable of partly lapping each other, as shown. The blocks when positioned on the shaft can be secured by means of set-screws $5^b$, $6^b$, as shown. The blocks 5 and 6 are provided with sharp knife-edged cutters $5^c$, $6^c$, respectively engaged in vertical slots in blocks 5 and 6, and fastened by means of set screws $5^e$, $6^e$, as shown. The cutters $5^c$, $6^c$, are particularly adapted for cutting gaskets from leather, and like material, and may be adjusted at any desired distances apart on sweep 1. The block 7 is also adjustable on the sweep 1, and can be fastened in position by a set screw $7^b$. It is provided with a wheel cutter $7^a$, adapted to cut glass or other material. The block 8 is provided with a diamond point 8ª, to cut glass; and can be adjustably fastened on the sweep 1 by set-screw 8ᵇ.

In operating the device the blocks which it is not desired to use are removed from the sweep, and such blocks as it is desired to use are placed thereon and adjusted the proper distance apart. Then the cutting apparatus is lowered into position over the sheet of material to be cut, which is laid upon the table as indicated at S in Fig. 1, and the operator then presses down on the shaft 1ª so as to cause the cutters to properly engage the material, and then moves sweep 1 around, by turning shaft 1ª by handle 1ᶠ. As sweep 1 moves each and every cutter thereon traverses a true circle, cutting disks or gaskets from the material, according to the number of cutters in operative position on the sweep. It will be noted that by placing several cutters on the sweep, a number of gaskets of different sizes can be simultaneously cut at each operation of the machine.

In order to facilitate positioning the sheets or plates of glass or stiff material beneath the cutting apparatus, I provide the table 4 at one side of plate 4ª with an adjustable gage 9. This gage is a right angled triangle and is secured at its apex to a slide 9ª, engaging a slotted guide plate 9ᵇ, attached to the table 4 at one side of plate 4ª, and lying at an angle of 45 degrees thereto. The gage 9 can be clamped where adjusted by means of a thumb nut 9ᶜ engaging a threaded post 9ᵈ on the slide, as indicated in Fig. 6. The gage when properly set enables the workman to quickly adjust a sheet of glass, or stiff material to be cut, properly upon the table, so that it will be cut accurately by the cutter, without his having to guess at the proper location of the sheet to insure the outermost cutter coming within the margins thereof. The gage also prevents the plate or sheet of glass slipping while being cut. Other material to be cut can be placed on the table at the opposite side of the plate 4ª, and the cutting apparatus can be readily brought into position for operation thereon by simply loosening nut 4ᵈ and turning the base plate 3ᵇ one-half way around. Thus the cutting apparatus can be readily and quickly adjusted to operate at either side of plate 4ª.

By using such machine for cutting glass disks, the necessity for patterns for each size disk is obviated, and disks of any desired size can be quickly cut, and any number of disks can be cut of exactly similar size. The machine can be used for cutting gaskets of any desired size from leather, paper, rubber and the like, and can make them of any desired internal and external diameters up to the maximum capacity of the machine, which is determined by the length of sweep 1. And several gaskets of different sizes can be cut simultaneously, the smaller gaskets being cut within and from the waste of the larger ones.

Having thus described my invention what I therefore claim as new and desire to secure by Letters Patent thereon is:

1. In a machine for cutting gaskets and the like, the combination of a sweep, and means for turning said sweep; with slide blocks adjustably mounted on said sweep, and adapted to lap each other, and cutters attached to the overlapping portions of said blocks.

2. In combination, a table, a member mounted thereon, a frame hinged to swing vertically on said member and having a vertically disposed sleeve on its free end, a vertical shaft journaled in said sleeve, a horizontal sweep on the lower end of said shaft, manually operable means for rotating said shaft on its upper end, a series of blocks adjustably mounted on said sweep, and cutters on said blocks.

3. In a machine for cutting gaskets and the like, the combination of a support, a horizontally disposed tubular member mounted thereon, a shaft journaled in said member, arms attached to said shaft and a vertically disposed housing attached to the outer ends of said arms; with a horizontal sweep, a vertical shaft to the lower end of which the sweep is attached, bearings for said shaft in said housing, a cutter mounted on said sweep, and means for manually rotating said shaft.

In testimony that I claim the foregoing as my own, I affix my signature in presence of two witnesses.

JAMES B. SHUTTLEWORTH.

Witnesses:
 HAROLD F. JEWETT,
 JOHN H. MINETTE.